United States Patent [19]
Herring et al.

[11] Patent Number: 6,144,031
[45] Date of Patent: Nov. 7, 2000

[54] INFRARED VIDEO CAMERA SYSTEM WITH UNCOOLED FOCAL PLANE ARRAY AND RADIATION SHIELD

[75] Inventors: Robert J. Herring, Maynard; Andrew C. Neilson, Groton; Daniel L. Manitakos, Peabody; Charles L. Confer, Bolton; Kevin J. Haded, Chelmsford, all of Mass.; Uri Bin-Nun, Keene, N.H.

[73] Assignee: Inframetrics Inc., North Billerica, Mass.

[21] Appl. No.: 08/845,124

[22] Filed: Apr. 21, 1997

[51] Int. Cl.[7] .................................. G01J 5/16; G01J 5/06
[52] U.S. Cl. ......................... 250/352; 250/353; 250/330; 250/252.1; 250/338.4
[58] Field of Search ..................... 250/352, 353, 250/330, 370.15, 252.1, 338.4

[56] References Cited

U.S. PATENT DOCUMENTS

| | | | |
|---|---|---|---|
| 4,754,139 | 6/1988 | Ennulat et al. | 250/353 |
| 5,277,782 | 1/1994 | DuPree et al. . | |
| 5,371,369 | 12/1994 | Kent . | |
| 5,420,419 | 5/1995 | Wood . | |
| 5,489,776 | 2/1996 | Lung . | |
| 5,523,563 | 6/1996 | Moessner | 250/352 |
| 5,528,035 | 6/1996 | Masarik et al. . | |
| 5,554,849 | 9/1996 | Gates . | |
| 5,675,149 | 10/1997 | Wood et al. | 250/330 |
| 5,763,885 | 6/1998 | Murphy et al. | 250/352 |
| 5,834,778 | 11/1998 | Veyrier et al. | 250/352 |

*Primary Examiner*—Constantine Hannaher
*Assistant Examiner*—Andrew Israel
*Attorney, Agent, or Firm*—Edward L. Kelley

[57] ABSTRACT

An infrared video camera system comprises an uncooled infrared sensor mounted and a thermally conductive thin walled radiation shield for shielding radiation from reaching an active surface of the uncooled infrared sensor. A TEC maintains the sensor active surface and the radiation shield at a substantially constant temperature. The uncooled infrared sensor and radiation shield are further housed in a hollow thermally conductive vacuum cover which is vacuum sealed with a base assembly and includes a vacuum sealed infrared transparent window in an aperture at a top end of the vacuum cover for allowing infrared radiation to reach the active surface and for forming a vacuum chamber enclosing the infrared sensor and radiation shield. A relay optical cell mounted to a camera body comprises at least one optical element for relaying an image formed at its entrance onto the active surface. An imaging optical assembly is interchangeably mounted to the relay optical cell and comprises at least one optical element for imaging an infrared scene to be imaged onto the entrance aperture of the relay cell. A plurality of different field of view imaging optical assemblies are interchangeably mounted without substantially changing the field of view of the sensor active surface.

35 Claims, 11 Drawing Sheets

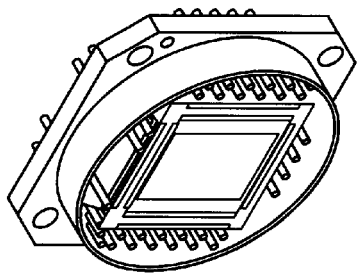
FIG. 4D
FIG. 4C
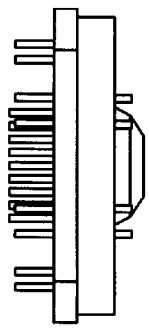
FIG. 4A
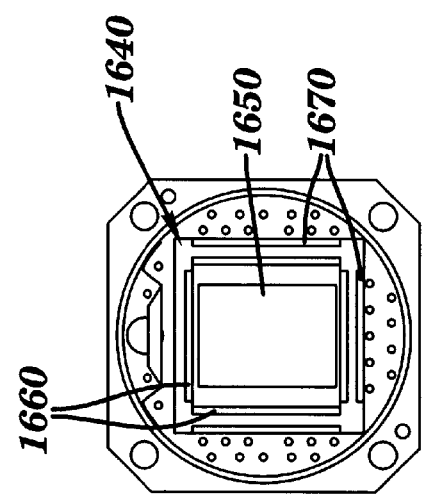
FIG. 4B

INFRARED VIDEO CAMERA SYSTEM WITH UNCOOLED FOCAL PLANE ARRAY AND RADIATION SHIELD

FIELD OF THE INVENTION

The present invention relates to video imaging and particularly to an infrared video camera which employs an uncooled infrared sensor such as an array of uncooled microbolometer detector elements or other monolithic uncooled silicon detector arrays.

BACKGROUND OF THE INVENTION

Video cameras employing infrared (IR) sensitive imaging elements have heretofore relied on cryogenically cooled IR sensitive focal plane arrays (FPA) or sensors with an associated cryogenic subsystem for maintaining the FPA sensor at temperatures in the range of 60° K. to 80° K. By stabilizing the temperature of the FPA sensor at temperatures which provide substantially zero thermal or infrared radiation emmission, any pixel to pixel temperature dependent response variations of individual sensor pixel elements is substantially eliminated since the sensor signal in response to thermal energy generated at cryogenic temperatures is substantially zero. Furthermore, by quickly removing thermal energy absorbed by or conducted to the sensor with the cryogenic subsystem, the signal generated by the sensor can be substantially attributed to the infrared radiation reaching the sensor from a scene to be imaged. Thus a very high signal to noise ratio is maintained.

It is also known to add a hollow cylindrical cold shield over the FPA sensor active surface to define its field of view. Such a cold shield provides a limiting aperture which defines a solid angle field of view of the active surface of the FPA sensor. By also maintained the cold shield at cryogenic temperatures a uniform temperature object having substantially zero infrared radiation emmission is provided at the edges of the field of view of each pixel of the FPA sensor active surface. It is also known to provide a cold shield having internal surfaces with high emmissivity for absorbing any stray infrared radiation not incident on the active surface and to provide external surfaces with low emmissivity at infrared wavelengths to reflect any infrared radiation away from the cold shield. Such a cold radiation shield and a method for making is disclosed e.g. by Du Pree et al. in U.S. Pat. No. 5,277,782.

By maintaining the FPA sensor active surface and the cold shield at cryogenic temperatures, a uniform substantially zero DC background signal is provided by each pixel of the FPA sensor active area in the absence of an infrared scene, i.e. when a camera aperture is blocked by a shutter. Cryogenically cooled systems provide good sensitivity to IR radiation at low levels and a high contrast IR image scene signal by providing a high signal to noise ratio. Cryogenically cooled IR imaging systems have been used for military applications, e.g. in missile tracking or night vision systems, but the high cost and difficulties associated with maintaining a cryogenic subsystem have limited commercial use.

More recently, microbolometer detector arrays or uncooled IR focal plane arrays (UFPA) operating near room temperature have allowed the elimination of cryogenic subsystems thereby reducing cost and complexity in infrared video cameras systems. An example of an IR video camera employing a UFPA is given by Wood in U.S. Pat. No. 5,420,419. Wood provides a microbolometer focal plane array housed within a vacuum chamber, which is sealed by a window invisible to the infrared wavelengths. A radiation receiving system provides a lens to image an infrared scene onto the active surface of the FPA and an iris for defining the solid cone angle of a field of view. A thermoelectric cooler, (TEC), attached to the back of the focal plane array replaces the cryogenic cooling apparatus of earlier systems. A closed loop temperature controller and temperature sensor, mounted proximate to the UFPA, stabilize the temperature of the focal plain array and associated housing at a substantially constant temperature of 22° C.

Such a system offers the benefit of lower cost, however, the microbolometer detector array suffers from excessive pixel to pixel non-uniformity's, due to its construction, as well as the drawback that since the detector array is maintained at room temperature, a DC background signal or dark signal, provided by each pixel in the absence of an IR scene, is substantially higher in an uncooled system than in a cryogenically cooled system and in some applications, the DC background signal amplitude can be much greater than the signal amplitude of the infrared scene to be imaged. Thus, the cost benefits gained by eliminating a cryogenic subsystems have been partially offset by the need to add a complex image signal processing apparatus to the camera electronics modules.

Examples of video electronic signal processing systems are given in U.S. Pat. No. 5,489,776, issued to Lung for a microbolometer FPA, and U.S. Pat. No. 5,528,035, issued to Masarik, for a pyroelectric FPA, both assigned to Hughes Aircraft Company. These examples address the problem of eliminating excessive pixel to pixel non-uniformity's in UFPA's and remove DC offset biases including the detector DC background signal and DC offset signals generated by system electronic components.

To calibrate a signal processing apparatus as described above, scene radiation is blocked, e.g. by an iris as described by Wood, cited above, and a dark signal is generated by each pixel of the FPA while it is shielded by the iris. The system dark response, given by the average dark signal response of each pixel, is stored on a pixel by pixel basis in a memory contained within a camera electronics module. When an infrared scene is imaged, the stored dark signal response is processed in combination the signal produced when the camera is illuminated by an IR scene and the scene signal alone is extracted and further amplified, thereby providing a corrected video scene image signal.

In radiometer applications where the absolute temperature of a scene is desired to be measured, a further step may include determining a response of the camera system while illuminated by a calibrated black body radiator radiating at a known black body temperature. The black body response of the system is then stored in a memory for later comparison to an infrared scene to be measured. This final step is beneficially performed in a factory environment where control of the process can be more readily maintained.

Numerous applications of IR video cameras require the use of various imaging lens of variable focal length to optimize resolution. In order to maximize the use of each pixel of the detector array, the IR scene to be imaged should fill the entire array area. For this reason, cameras are made available with variable focal length as well as interchangeable imaging optical systems having a wide range focal lengths and fields of view. Applications range from very long focal lengths in excess of 200 mm to microscope objectives having focal lengths in the range of 0.10 mm. By interchanging imaging optical systems the average dark signal response of at least some pixels in the array, especially those pixels near the edges of the array, can vary as the system field of view and the configuration of the imaging optical system varies. It has therefore been necessary to recalibrate the average system dark signal response each time a new imaging optical system is mounted on the camera. Furthermore, in radiometer applications where the black body temperature of an infrared scene image is determined by comparing the camera response for the infrared scene to be imaged with the camera response for a black body radiator of known black body temperature, a factory recalibration has been required for each imaging optical system which is intended to be used with the camera system.

Thus, the camera system dark signal response is periodically determined in the field by providing a shutter for blocking the camera aperture. Such a procedure is normally performed, e.g. each time the camera is powered up such that a new camera system dark signal response is stored in memory for each use. It is also typical that a camera system be recalibrated i.e. determining the average dark signal response each time the imaging optics of the camera system are interchanged with another imaging optics assembly.

In radiometric measurement applications, the calibration of the system response of a camera to a black body radiator of known black body temperature is performed in the factory. The calibration is performed with camera system maintained at a known ambient temperature and with a particular imaging optics assembly installed. A system black body response is stored in a memory module for use in the field. In the field when a different imaging optics assembly is installed, the stored system black body response no longer directly applies and a error in the measured temperature of the infrared scene to be imaged can occur unless a new system response is reestablished in a factory setting. This is an inconvenient to the user.

An additional disadvantage of present systems is that as the camera system and associated optical and electronic components are frequently cycled through various ambient temperature environments, as well as through a camera system electronic power-up cycle. These varying conditions cause the temperature of the camera system to slowly drift in time. Thus the camera system itself can emit varying amounts of infrared radiation which may drift across the field of view of the detector array causing the instantaneous system dark signal response to vary from a dark signal response stored in a memory module at the most recent dark signal calibration. This slowly drifting instantaneous dark signal response ultimately degrades imaging performance.

Thus, a need exists in the art to provide a low cost video camera with the ability to operate over a range of ambient temperature conditions while still maintaining a constant imaging performance.

A further need exists in the art to provide a low cost video camera which can adapt to perform with a variety of interchangeable imaging optical systems for a variety of video imaging applications while still maintaining a constant imaging performance.

A still further need exits in the art for a low cost video radiometer which can adapt to perform radiometric measurements over a range of ambient temperature conditions and with a variety of interchangeable imaging optical systems for a variety of applications while still maintaining accurate temperature measurement performance without having to be recalibrated in a factory environment.

Accordingly it is a primary object of the present invention to provide a low cost infrared video camera with a substantially uniform dark signal response over a wide range of operating temperatures.

It is a further object of the present invention to provide a low cost infrared video camera which can adapt to perform with a variety of interchangeable imaging optical systems while still maintaining a substantially uniform dark signal response from one interchangeable optical system to another.

It is a still further object of the present invention to provide a low cost video radiometer which can adapt to perform radiometric measurements over a range of operating temperature conditions while providing an accurate absolute temperature measurements.

It is another object of the present invention to provide a low cost video radiometer which can adapt to perform radiometric measurements with a variety of interchangeable imaging optical systems for a variety of applications while providing an accurate absolute temperature measurement without having to recalibrate the black body response of the radiometer system for each interchangeable imaging optical system in a factory environment.

SUMMARY OF THE INVENTION

An uncooled infrared sensor assembly comprises an uncooled infrared sensor having an active surface for providing an analog video signal in response to infrared radiation falling thereon. A thermally conductive thin walled radiation shield for shielding radiation from the active surface of the uncooled sensor has a bottom end thermally conductively connected to the uncooled infrared sensor and a top end for providing a shield aperture for defining a field of view of said active surface. A TEC is included in the uncooled infrared sensor assembly for maintaining the infrared sensor and the thermally conductive thin walled radiation shield at a substantially constant temperature. Also provided are a temperature sensor for sensing a temperature proximate to the active surface and an electrical driver, in communication with the TEC and the temperature sensor, for driving the TEC to maintain a temperature proximate to said active surface at a substantially constant temperature.

A header base includes a top surface for supporting the uncooled infrared sensor with the active surface facing away from the top surface. The header base includes and a header cover flange for supporting a hollow thermally conductive vacuum cover having an open bottom end, for forming a vacuum seal with the header base flange, and a top end having a top wall forming a cover aperture. The hollow thermally conductive vacuum cover is formed to surround the thermally conductive thin walled radiation shield. An infrared transparent window is vacuum sealed with the hollow thermally conductive vacuum cover at the open top end to seal the aperture such that infrared radiation passes through the window to the active surface. A vacuum chamber encloses the infrared sensor active surface, the thermally conductive thin walled radiation shield and the TEC. The vacuum chamber is evacuated and maintained at a pressure below atmospheric pressure during use.

The uncooled infrared sensor assembly can be maintained at a substantially constant temperature in the range of 0° C. to 40° C. and may be an array of microbolometric detector elements or a pyroelectric sensor. Furthermore the TEC may be thermally conductively connected at a first side to the uncooled infrared sensor and at a second opposite side to a first heat sink and heat pipe connected at a first end to the first heat sink draws thermal energy to a second heat sink connected to the heat pipe at a second opposite.

In order to reduce stray radiation, the thermally conductive radiation shield may includes an inner wall treated to provide high emmissivity and an outer wall treated to provide low emmissivity. In addition a sensor baffle having a sensor aperture substantially matching the size and shape of the active area, may be mounted inside the thermally conductive thin walled radiation shield to block radiation reflected from the interior wall of the thin walled radiation shield from reaching the active surface.

In another embodiment of the present invention, an infrared video camera system, comprises a camera body for housing an electronics module, an uncooled infrared sensor having an active surface for providing an analog video signal in response to infrared radiation falling thereon and a thermally conductive thin walled radiation shield for shielding radiation from the active surface. The radiation shield comprises a bottom end thermally conductively connected to the uncooled infrared sensor and a top end for providing a shield aperture for defining a field of view of said active surface. The camera may also include a TEC for maintaining the uncooled infrared sensor and the thermally conductive thin walled radiation shield at a substantially constant temperature and a temperature sensor for sensing a temperature proximate to said active surface and an electrical driver, in communication with the TEC and the temperature sensor, for driving the TEC to maintain the temperature proximate to the active surface at a substantially constant temperature.

The camera may also include a header base having a top surface for supporting the uncooled infrared sensor with the active surface facing away from the top surface with the header base including and a header cover flange for supporting a hollow thermally conductive vacuum cover having an open bottom end, for forming a vacuum seal with the header base flange, and a top end having a top wall forming a cover aperture. The hollow thermally conductive vacuum cover surrounds said thermally conductive thin walled radiation shield and an infrared transparent window is vacuum sealed with the hollow thermally conductive vacuum cover at the open top end to seal the aperture such that infrared radiation passes through the window to said active surface and wherein a vacuum chamber encloses the infrared sensor active surface, the thermally conductive thin walled radiation shield and the TEC and the vacuum chamber is evacuated and maintained at a pressure below atmospheric pressure to allow more efficient temperature control of the active surface.

The infrared video camera system may further comprising a first heat sink thermally conductively mounted to the TEC with a second heat sink mounted external to the camera body and heat pipe thermally connected between said first and second heat sinks for drawing thermal energy from the first heat sink to the second heat sink mounted externally to said camera body. The second heat sink may also have a larger heat sink capacity than said first heat sink to improve efficiency.

The infrared video camera system also includes a relay optics cell mounted to the camera body. The relay optics cell includes a relay optics cell exit aperture at a camera end and a relay optics cell entrance aperture at an opposite end to the camera end. The relay optics cell further comprises at least one optical element for relaying an image of its entrance aperture onto the active surface. The image of the entrance aperture substantially filling the active surface.

An imaging optics assembly is mounted to the relay optics cell at the opposite end. The imaging optics assembly comprises at least one optical element for forming an IR scene image onto the entrance aperture of the relay cell. The IR scene image substantially fills said entrance aperture of the relay cell. The relay optics cell may also provide a mounting interface for mounting an optical filter element substantially coincident with its entrance aperture and the mounting interface may also provide for interchangeably mounting a plurality of optical filter elements. Furthermore, a plurality of imaging optics assemblies, each having a different field of view, may be interchangeably mountable with the relay optics cell wherein each of the plurality of imaging optics assemblies forms an IR scene image which is substantially coincident with and substantially fills said relay cell entrance aperture.

A shutter for blocking radiation from reaching said active surface may also be included inside a cavity within the relay optics cell. A processing module is included in the electronics module for receiving and processing an analog video dark signal value from each of the plurality of image pixels of the active area while it is blocked by the shutter. The processor further receives and processes an analog video scene signal value from each of said plurality of image pixels while the active area is illuminated by an IR scene. A memory module stores each of the analog video dark signal values and the processor module processes each of said analog video scene signal values received from each of the plurality of image pixels while the camera is viewing an IR scene by adjusting each of the analog video scene signal values according to a corresponding dark signal value.

In a radiometer mode, the infrared video camera is used to determine the temperature of a black body radiator. Here a processing module is included in the electronics module for receiving and processing an analog video signal from each of the plurality of image pixels while the sensor active area is illuminated by a black body of known black body temperature. The processor thereby determines black body response for a known black body temperature. The processor further receives and processes an analog video scene signal value from each of the plurality of image pixels while the active area is illuminated by an infrared scene which includes a black body of unknown black body temperature. A memory module stores the known black body response value for each of the plurality of pixels. The processor module processes each of the analog video scene signal values received from each of the plurality of image pixels while the camera is illuminated by an infrared scene which includes a black body of unknown black body temperature by adjusting each of the scene signal values according to a corresponding analog video known black body response signal value.

BRIEF DESCRIPTION OF THE DRAWINGS

FIG. 4 depicts a carrier board mounted between the UFPA sensor and the header base cover.

DETAILED DESCRIPTION OF THE INVENTION

Figure 1:
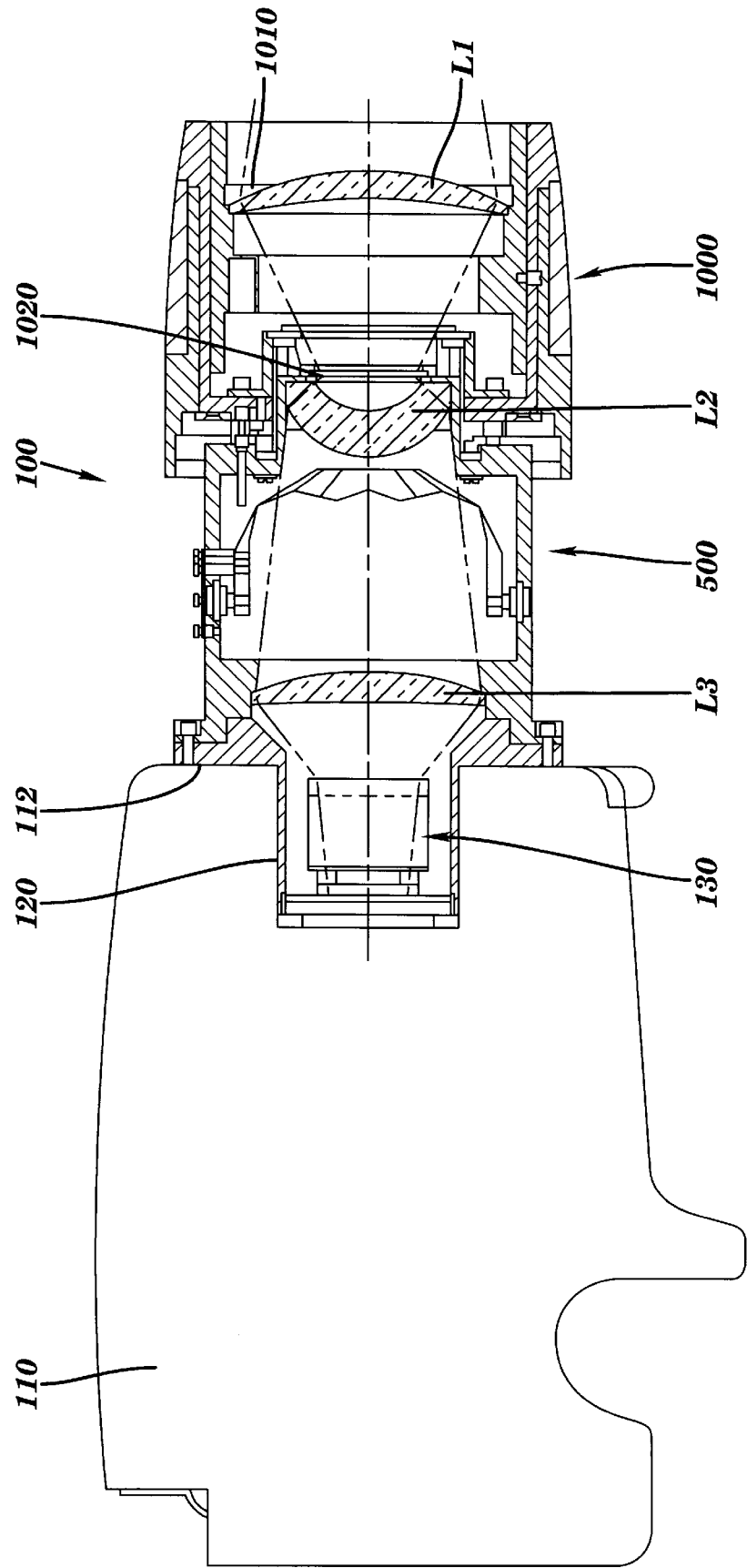
FIG. 1 depicts a side view of a video camera system in partial section.

An infrared video camera system, generally referred to by reference numeral 100 is depicted in FIG. 1. Such a camera system includes a camera body 110 for housing a power supply, an electronic module for receiving video signals from a focal plane array (FPA) sensor, an image processing apparatus for processing video signals and a data storage memory, all of which will be detailed in sections below. The camera body 110 includes a hollow recess 120 in an external face 112 for receiving an uncooled focal plane array (UFPA) assembly, referred to generally by reference numeral 130. The infrared sensor assembly 130 includes an active surface 180, shown in FIG. 2. The position of the center of the active surface 180 is tightly controlled with respect other features of the sensor assembly 130 as will be detailed below.

Figure 2:
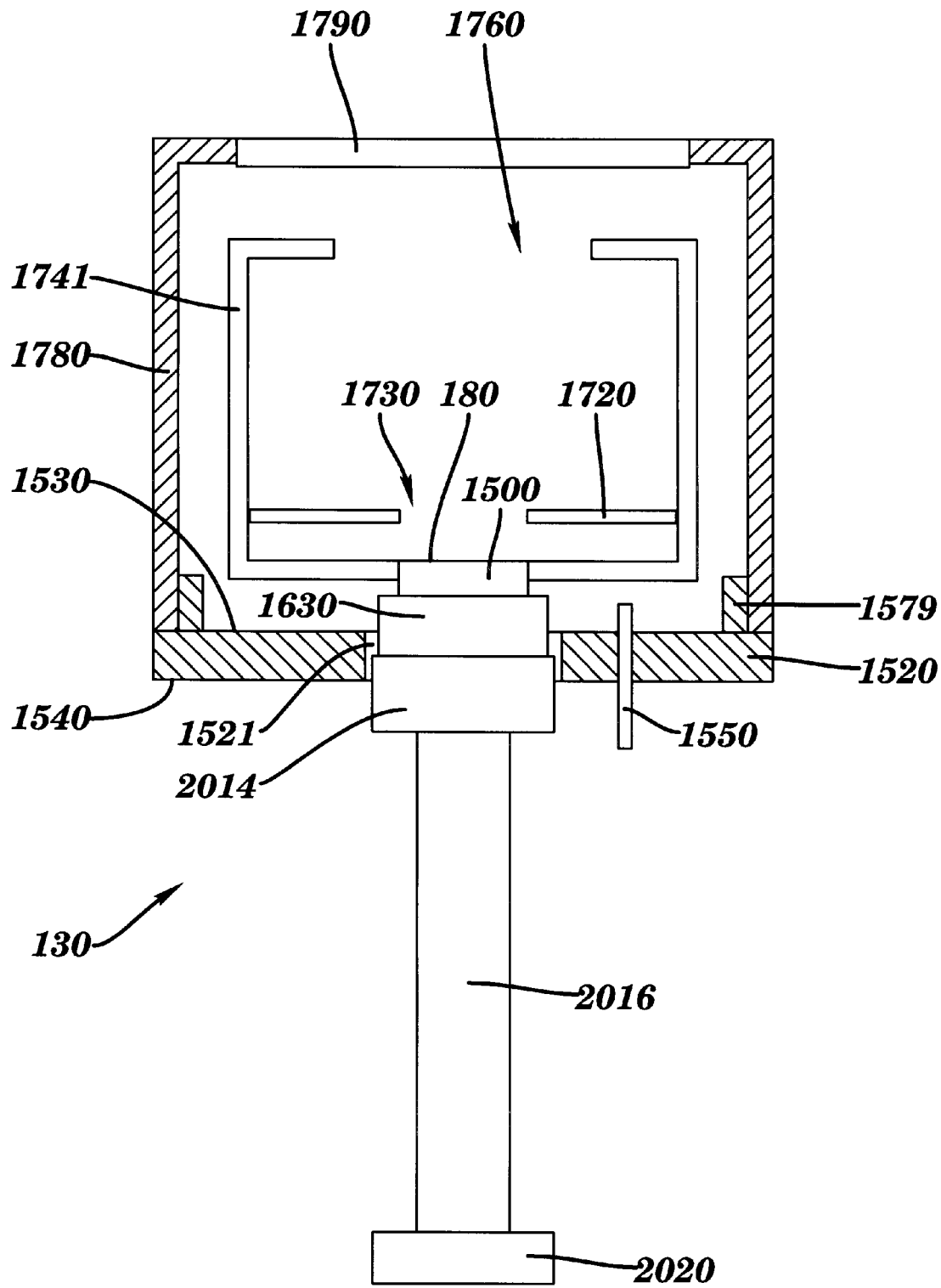
FIG. 2 depicts a section view of UFPA sensor mounted to a TEC and a thin walled radiation shield mounted directly to the UFPA sensor.

Referring now to FIG. 2, sectional view of a first embodiment of the present invention shows the infrared sensor assembly 130 which includes a UFPA IR sensor 1500 mounted directly to a TEC 1630 and to a header base 1520. The packaged sensor 1500 has a RS-170 TV format and includes standard connection pins 1550 for providing power to the FPA sensor and for transferring an analog video signal from the FPA sensor 1500 to an electronic module, detailed below. The usable waveband response of the sensor 1500 ranges from 8–14 μm. Such a sensor is marketed by, Rockwell Electro-Optics Center, however, any uncooled infrared sensor used for video IR imaging would function equivalently in the present invention.

Figure 3D:
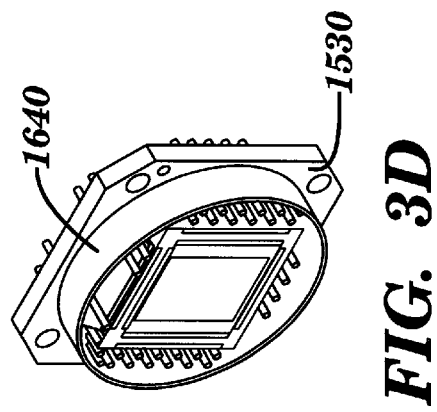
FIG. 3 depicts a UFPA detector sensor mounted to a header base and includes a TEC assembly mounted in a gap between a header base cover flange portion and the UFPA sensor.
Figure 3C:
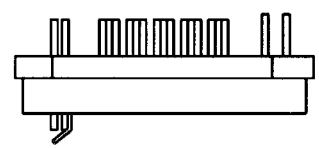
Figure 3A:
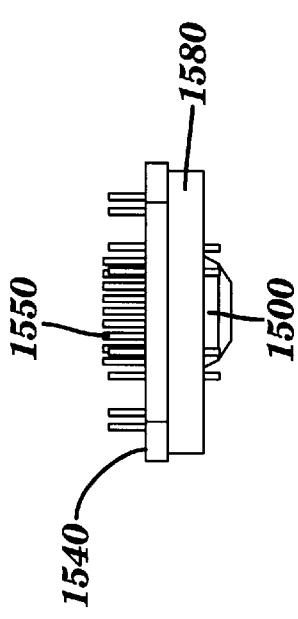
Figure 3B:
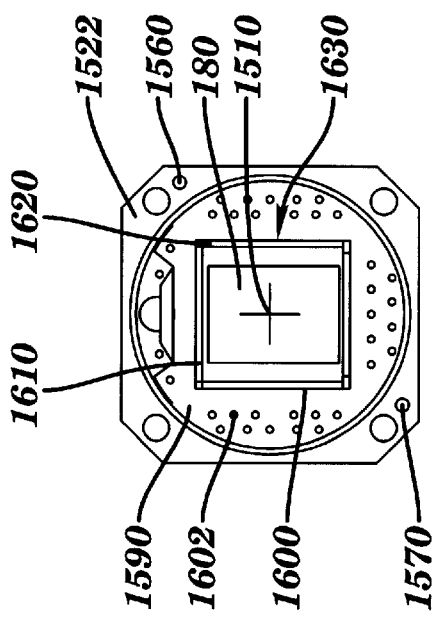
Figure 5D:
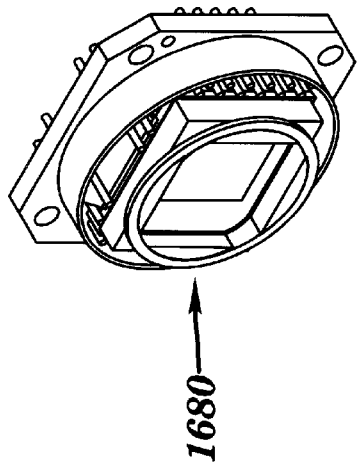
FIG. 5 shows a radiation shield base mounted to the carrier board.
Figure 5C:
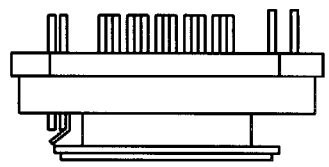
Figure 5A:
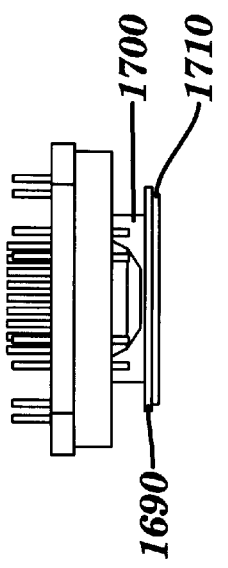
Figure 5B:
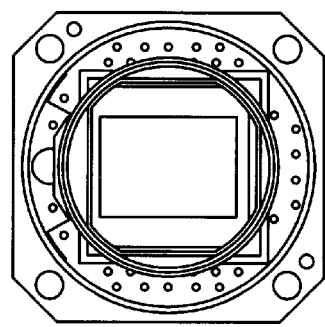

Sensor 1500 includes a rectangular focal plane array active surface 180, shown in FIG. 3B, which has a center 1510. In the present embodiment surface 180 includes an array of 320×240 active imaging pixels each having its center located on a fixed grid and each pixel being separated from the surrounding pixels by an inactive region, (not shown).

Header base 1520 provides a mounting interface for the sensor 1500 and provides an electrical interface between the sensor and an electronics module via connecting pins 1550. Header base 1520 includes an aperture 1521 for providing access to mount the TEC 1630 directly to the base of the IR sensor 1500 for removing thermal energy therefrom. A single piece thin walled thermally conductive cylindrical radiation shield 1741 is thermally conductively mounted directly to the sensor 1500. A cylindrical thermally conductive vacuum cover 1780 is thermally conductively vacuum sealed to the header base 1520 at a flange 1579. An IR transparent window 1790 is vacuum sealed with the vacuum cover 1780 forming a vacuum chamber enclosing the sensor 1500 and the radiation shield 1741. A sensor baffle 1720 includes a sensor aperture 1730 which will be detailed below.

Header base 1520 includes a top surface 1530 onto which the IR sensor 1500 is mounted and a bottom surface 1540. Connecting pins, referred to generally by reference numeral 1550 pass through the header base 1520 and connect with an electronics module, not shown. At the header base top surface 1530, IR sensor 1500 is mounted with the active surface 180 facing away from top surface 1530 and with the parallelism of active surface 180 tightly controlled with respect to top surface 1530 to ensure that an IR scene imaged onto surface 180 is in focus over its entire surface. At least two positioning holes 1560 and 1570 shown in FIG. 3B are provided in header base 1520 for positioning UFPA assembly 130 within the camera system. The position of holes 1560 and 1570 is tightly controlled with respect to active surface center 1510. Thus a first embodiment of the invention is provided above and in FIG. 2 detailing a single piece radiation shield 1741 and a TEC 1630 each mounted directly to the IR sensor 1500.

For reasons of ease of manufacture, a second embodiment of the present invention is preferred over the embodiment shown in FIG. 2 and detailed above. The a preferred embodiment is detailed here below with like elements being numbered the same in each embodiment. Referring now to FIG. 3A–7D, a header base 1522 is similar to header base 1520 detailed above and provides a top surface 1530 for the IR sensor 1500 and pins 1550 for passing a video signal from the IR sensor 1500 to an electronic module. A thermally conductive header cover flange 1580 mounts to header base 1522 on its top surface 1530. Header cover flange 1580 includes a base surface 1590 having a large rectangular aperture 1600 and a plurality of smaller apertures 1602 formed therein. Large aperture 1600 is centered about the center of the array active surface 1510. A rectangular flange 1610 surrounds aperture 1600 to a height above top surface 1530 which is substantially equal to the height of the sensor 1500 above top surface 1530. The plurality of smaller apertures 1602 allow connector pins 1550 to pass through the base surface 1590 and the header base 1522. A cylindrical flange 1640 forms the perimeter of header cover flange 1580.

A gap 1620 is provided between the sensor 1500 and rectangular flange 1610. A TEC 1630 is bonded in the gap 1620 such that both the sensor 1500 and the rectangular flange 1610 are in thermal contact with the TE cooler 1630 and thereby thermally conductively connected. A thermally conductive non-electrically conductive adhesive is used for this application. A temperature sensor, included within sensor 1500 or mounted proximate to the sensor 1500, senses the temperature at the focal plane array active surface 180 and a controller, (not shown) drives the TEC 1630 to stabilize the temperature of an area proximate to the active surface 180 at a selected temperature near room temperature, e.g., 22° C.

A carrier board 1640, shown in FIG. 4B provides a wiring interface between the sensor 1500 and the connector pins 1550. Carrier board 1640 forms a flat rectangular perimeter having rectangular a large center aperture 1650 and a plurality of wire connecting terminals 1660 surrounding the aperture 1650 and a plurality of wire connecting terminals 1670 adjacent to the perimeter of the carrier board 1640. Carrier board 1640 is bonded to sensor 1500 with its center aperture 1650 centered about the array active surface 180. A first set of wire leads from sensor 1500 are electrically connected to the carrier board wire connecting terminals 1660 and a second set of wire leads are electrically connected between the carrier board wire connecting terminals 1670 and the plurality of connector pins 1550 above the top surface 1530. Carrier board 1640 provides a conductive path between the wire interconnecting terminals 1660 and 1670 such that an electrical path is provided from each pixel of the sensor 1500 to connection terminals 1660, at the inner perimeter of carrier board 1640, through the conductive carrier board 1660 to the connecting terminals 1670, at the outer perimeter of the connector board 1640, to the connector pins 1550 at a connecting point above the top surface 1530 and then through the header cover flange 1580 and header base 1522, via the connecting pins 1550 an then to the electronics module contained inside the camera body 110.

A thermally conductive radiation shield base, referred to generally by reference numeral 1680, shown in FIG. 5A–5D, has a circular rim section 1690, a rectangular flange 1700 formed on its bottom side and a circular flange 1710 formed on its top side. Rectangular flange 1700 is sized for bonding to carrier board 1640 such that the walls of rectangular flange 1700 are centered between wire connecting terminals 1660 and 1670 on all four sides.

Figure 6D:
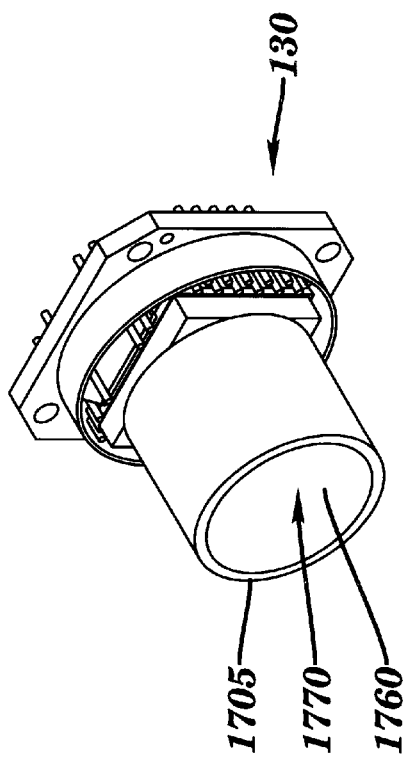
FIG. 6 shows the radiation shield mounted to a radiation shield base and includes the shield aperture, the sensor baffle and the sensor aperture.
Figure 6C:
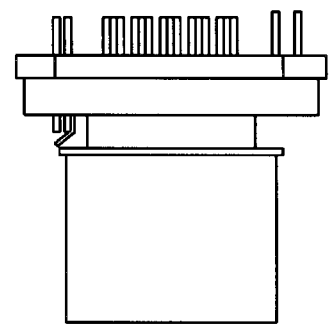
Figure 6A:
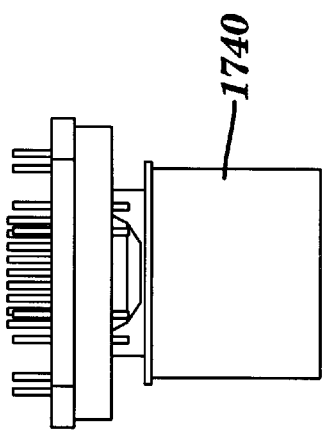
Figure 6B:
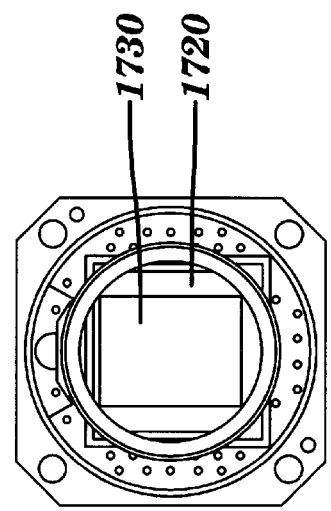
Figure 7C:
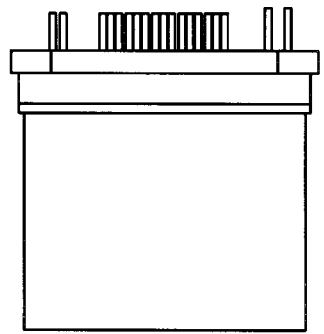
FIG. 7 depicts a UFPA assembly having a vacuum chamber cover and aperture window.
Figure 7D:
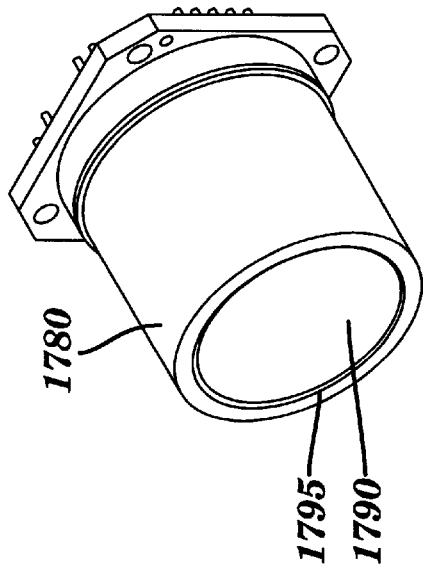
Figure 7A:
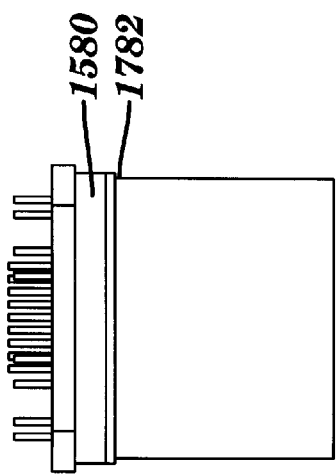
Figure 7B:
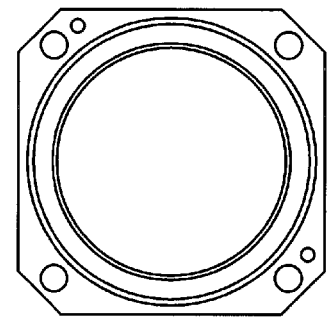

A sensor baffle 1720, shown in FIG. 6B and in FIG. 2, is a flat member having a large rectangular sensor aperture 1730 centered with respect to the sensor active surface center 1510. The sensor baffle 1720 is bonded to the circular rim section 1690 of radiation shield base 1680 . Sensor aperture 1730 is sized to substantially match the sensor active surface 180 while baffle 1720 blocks any radiation reflected from a surface near the sensor from reaching the sensor active area 180.

A thermally conductive thin walled cylindrical radiation shield 1740, shown in FIG. 6A–6D, is mounted to radiation shield base 1680. The radiation shield 1740 is typical of radiation shields previously used in cryogenically cooled infrared cameras and infrared systems in that it comprises a very thin walled thermally conductive cylinder, (e.g. 0.002–0.004 inch thick copper), having an internal diameter sized to fit onto circular flange 1710 for bonding thermally conductively therewith, and a top wall 1705, which includes a circular shield aperture 1760, sized to limit the field of view of the sensor active surface 180.

The internal surfaces of the radiation shield 1740 as well as the surfaces of sensor baffle 1720 are given a high emmissivity surface by e.g. providing diffraction grooves or dendrites thereon or an oxide surface thereon. The external surfaces of radiation shield 1740 are given a low emmissivity surface by e.g. coating it with gold. Furthermore, sensor baffle 1720, radiation shield base 1680 and header cover flange 1580 are also constructed to provide high thermal conductivity while providing high emmissivity coatings at surfaces facing the sensor 1500 and low emmissivity coatings at surfaces facing away from the sensor 1500.

Thus a radiation shield chamber 1770 is formed to surround the sensor 1500. The chamber referred to generally by reference numeral 1770 is bounded at its bottom end by the FPA active surface 180 and the carrier board 1640 which passes electrical signals in and out of the chamber. Chamber 1770 has a rectangular lower section bounded by rectangular flange 1700 and is sealed at its bottom end by the bonded of the rectangular flange 1700 with the carrier board 1640. Sensor baffle 1720 separates the rectangular lower section of chamber 1770 from the cylindrical upper section defined by the radiation shield 1740. The chamber 1770 is bounded at its upper section by the top wall 1750 which includes the aperture 1760 for limiting the entering radiation to a prescribed solid cone angle, thereby defining the camera system field of view.

Care is taken during the assembly of the chamber 1770 to bond each component using a thermally conductive adhesive so that an uninterrupted thermally conductive path is provided between the TEC 1630 and all surfaces of the chamber 1770. However, a solder construction or other suitable thermally conductive joining method could also be used. Thus chamber 1770 as well as sensor 1500 are maintained at substantially the same constant temperature by the TEC in communication with a temperature stabilizer controller driver for driving the TEC and a temperature sensor, (not shown), mounted proximate to the active surface 180. Additional temperature sensing elements and TEC's as well as additional closed loop controller elements may also be positioned within or proximate to the chamber to further control and maintain the temperature of the sensor and the surrounding chamber at a constant level.

A thermally conductive cylindrical vacuum chamber cover 1780, shown in FIG. 7A–7D and in FIG. 2, is sized at its lower end 1782 to fit onto header cover cylindrical flange 1640 and is laser welded thereto to provide a vacuum tight seal therewith. An infrared transparent window 1790 which sized so as not to limit the camera system field of view, established by shield aperture 1760, is brazed into an aperture 1795 in vacuum chamber cover 1780 to seal the chamber 1770 which is then evacuated e.g. to $10^{-6}$ mBAR MIN. Thus the chamber 1790 is a vacuum chamber bordered by the header flange 1580, the vacuum cover chamber 1780 and the infrared transparent window 1790 such that the temperature within is more easily stabilized due to the lack of air.

Since the temperature of the chamber 1770 and its surfaces are substantially constant, the chamber walls serve to provide a substantially uniform non-varying infrared radiation scene to the active surface 180. Shield aperture 1760 defines the field of view of the camera system 100 which subtends a solid angle defined by a set of marginal rays which originate at the center of each pixel of the active surface 180 and are tangent to the diameter of shield aperture 1760. Thus for all angles which are outside the solid cone angle which defines the system field of view each pixel views a uniform non-varying infrared image provided by the internal walls of the constant temperature radiation shield 1740. Furthermore, any infrared radiation which enters the chamber 1770 from an angle outside the solid angle defined by the sensor aperture 1730 would necessarily strike the inner surfaces of the radiation shield 1740 or the sensor baffle 1720 and be substantially absorbed by the dendrite coated surfaces. The chamber 1770 thus substantially limits time varying background radiation from reaching the sensor active surface 180, to only that radiation received from the infrared scene to be imaged by providing a uniform temperature, time invariant, radiation scene to each pixel for all angles not included in the camera field of view. Thus the chamber 1770 provides improved imaging by reducing time varying background radiation caused by ambient and internally generated temperature cycles of the sensor 1500 and its surrounding housing.

Figure 8:
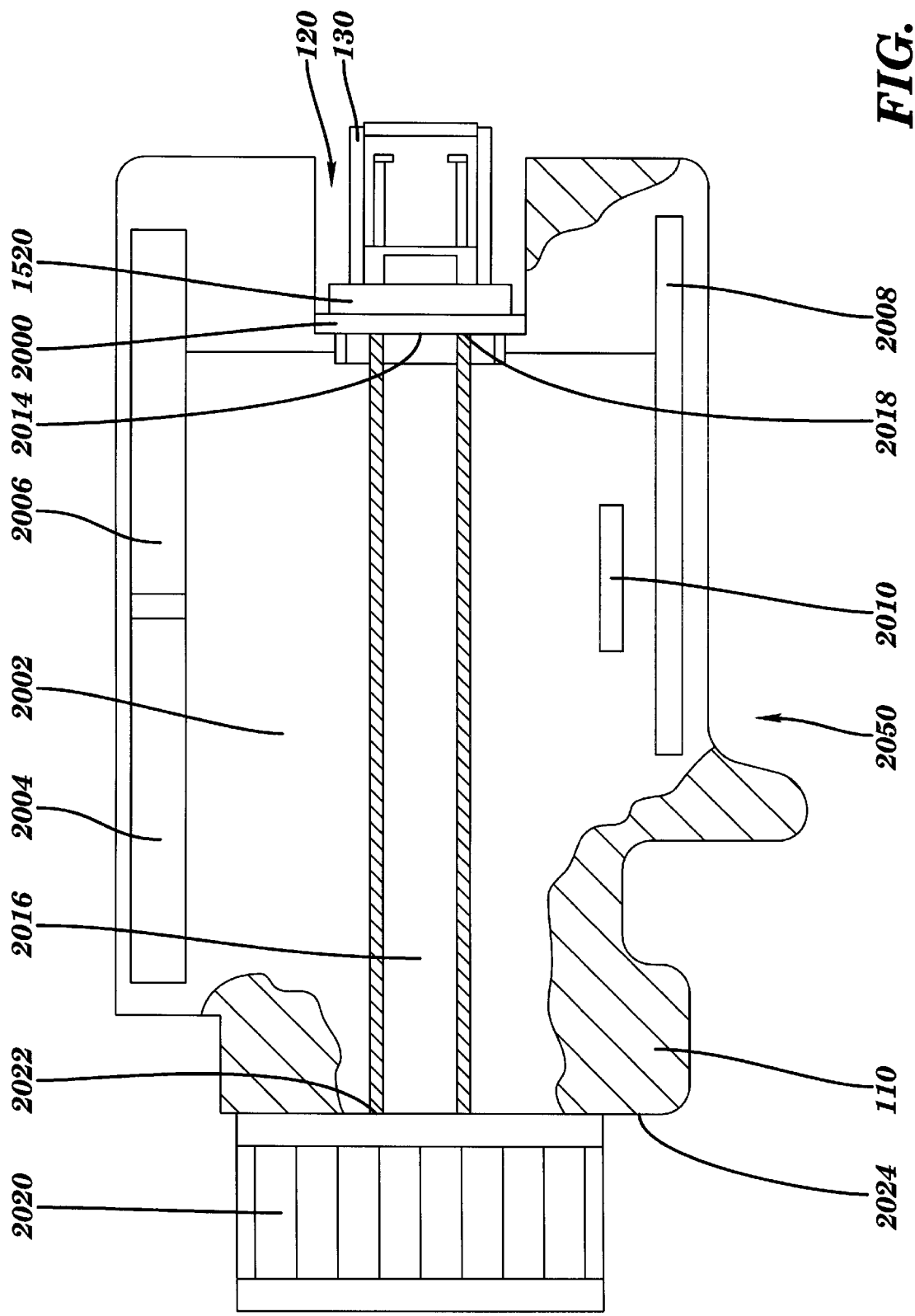
FIG. 8 shows a camera body partially cut-away to schematically detail components contained within cavity inside the camera body.

A camera body 110 is shown partially cut away in FIG. 8. The UFPA assembly 130 positioned within hollow cavity 120 has its connector pins 1550 passing through a wall 2000 and into a camera body cavity 2002. The cavity houses an electronics module comprising a DC power supply 2004, a clock module 2006 for controlling data acquisition from the sensor 1500, a digital video signal processing module 2008 for digitizing an analog video signal received from the sensor 1500 and for processing that analog video signal to at least compensate for a DC offset and pixel to pixel response variations in the signal received from the sensor 1500. Also included is at least one pixel memory module 2010 for storing, e.g. a video dark signal value from each pixel of the sensor 1500 recorded while the active surface is blocked, or, an analog video known black body signal value from each pixel of the sensor 1500 while the active surface is illuminated by a black body of known black body temperature, or, other image data for each pixel in the sensor array. Other memory modules may also store various command sequences for operating and controlling the camera or may store video images of an infrared scene.

In order to more efficiently remove heat from the UFPA sensor assembly 130, a heat pipe 2016 may also be used. Shown in FIG. 8 and, a first heat sink 2014 mounts to the bottom surface 1540 of header base 1520 or 1522 or and as shown in FIG. 2 the heat sink 2014 mounts directly onto a surface of the TEC 1630. In either care a thermally conductive path is provided between the TEC 1630 and the heat sink 2014 such that any heat removed from the sensor 1500 and the radiation shield base 1680, as well as the radiation shield 1740 is substantially passed to the first heat sink 2014. The heat pipe 2016 is thermally conductively connected to the first heat sink 2014 at a first end 2018 and passes through the camera body cavity 2002 to a second-heat sink 2020 also thermally conductively connected to the heat pipe 2016 at a second end 2022. The second heat sink 2020 is external to the camera body and attaches to an external wall 2024.

Figure 9:
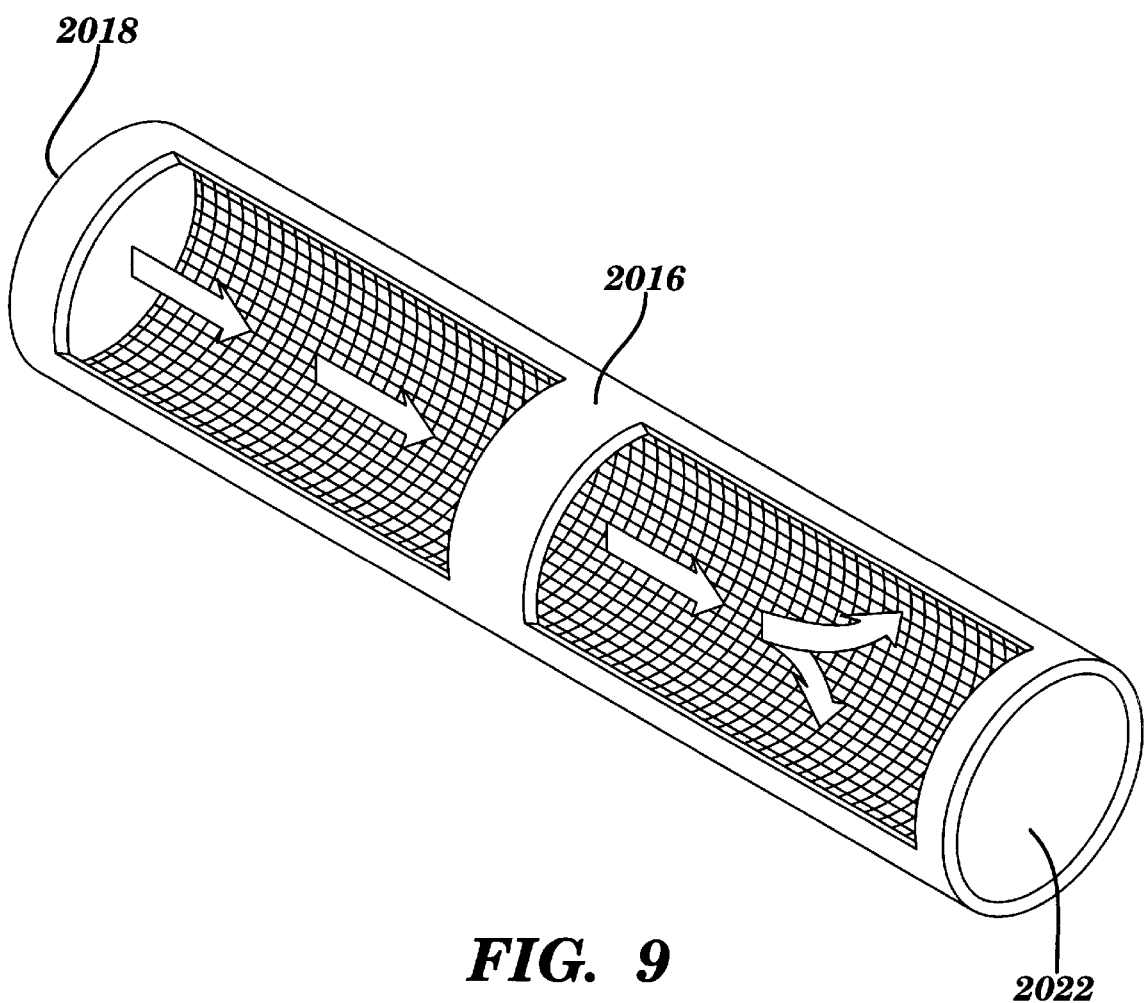
FIG. 9 depicts a partially cut-away heat pipe.

The heat pipe 2106, shown partially cut-away in FIG. 9, is constructed from an annealed hollow copper tube having a sintered copper powder wicking structure contained therein. The heat pipe 2106 is filled with water as a working fluid and uses an evaporation cycle to remove thermal energy from the first end 2018 to pass the thermal energy to the second end 2022. Such a heat pipe is commercially available in the United States from THERMACORE Inc. of Lancster Pa. The ends of the heat pipe 1018 and 2022 are thermally conductively connected to the heat sinks 2014 and 2020 such as by soldering, conductive epoxy or clamping using a thermally conductive grease in the joint. The heat pipe 2016 can operate in any orientation and thus more efficiently removing heat from the first heat sink 2014 thereby allowing the TEC 1630 to maintain a more uniform temperature of the UFPA assembly 130. This improves the video image quality by providing a more uniform infrared signal from the region outside the camera field of view while also reducing variations in the sensor DC offset signal.

Figure 10:
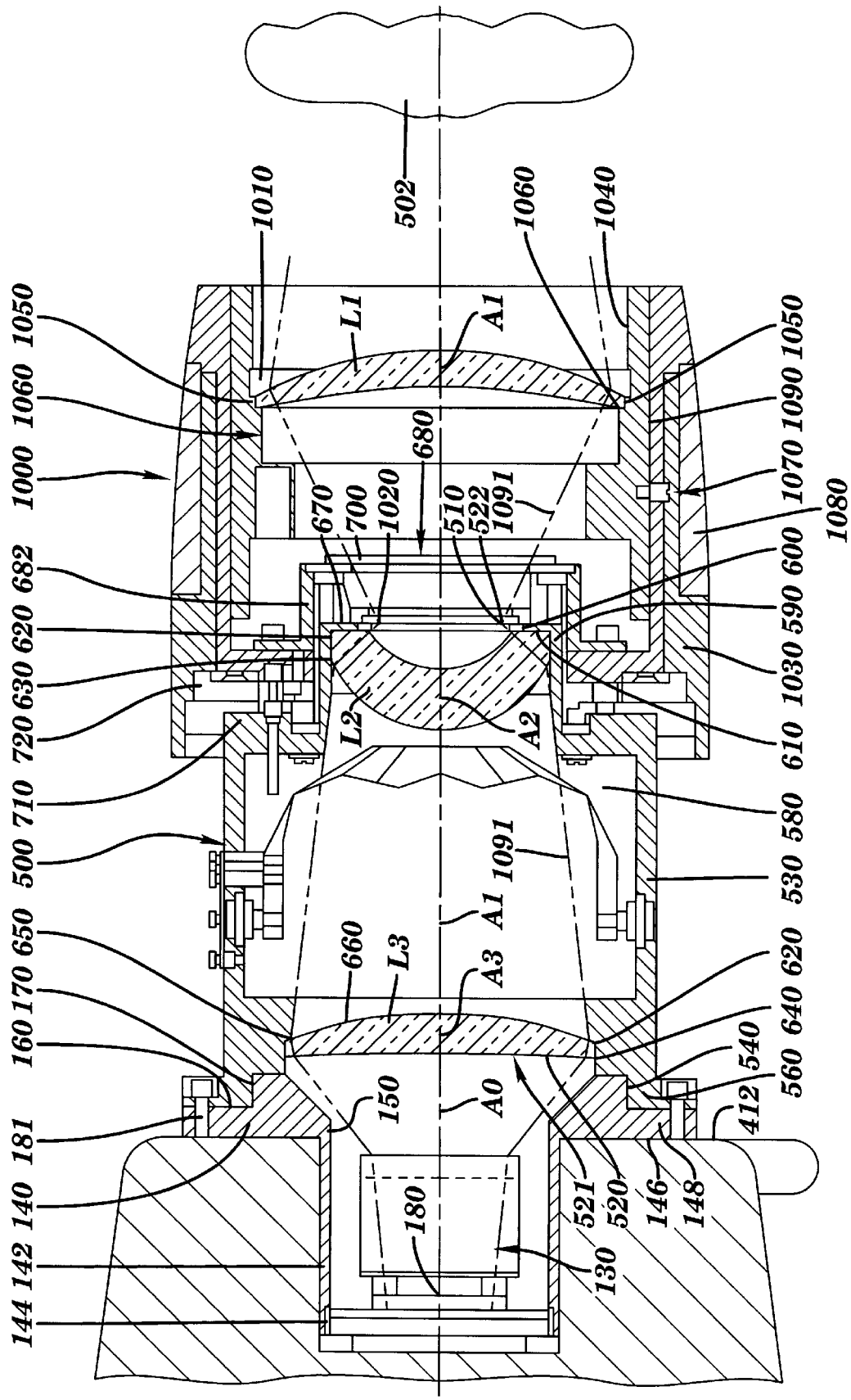
FIG. 10 show a section through a UFPA assembly, relay optics cell and an imaging optics assembly with a 16° field of view.

Referring to FIGS. 1 and 10 the camera system 100 further includes a relay optics cell, referred to generally by reference numeral 500 and an imaging optical assembly, referred to generally by reference numeral 1000. Infrared radiation from an infrared scene to be imaged 502 enters the camera system 100 through the imaging optical assembly entrance aperture 1010 and forms an image of the scene 502 at an imaging system focal plane 1020. The relay optics cell 500 relays the image of the scene 502 formed by the imaging optics assembly 1000 at the imaging system focal plane 1020 to the focal plane array surface 180.

Attached to the camera body 110 is a camera interface bracket 140. Bracket 140 includes an annular portion 142 sized to fit within hollow recess 120 and mate at its camera end 144 with the sensor assembly 130. An internal bore 150 passes through the full length of bracket 140. A flange portion 148 attaches to external face 112 at mounting surface 146 and includes an annular mounting surface 160 and a locating diameter 170. The longitudinal axis of mounting diameter 170 defines a camera interface bracket reference axis, A0, which is positioned substantially coincident with the center of the focal plane array surface 180 during assembly of the camera interface bracket 140 with the UFPA assembly 130. The position of surfaces 146 and 160 are tightly controlled with respect to the surface of the focal plane array surface 180 such that surface 160 and locating diameter 170 provide locating reference surfaces for accepting and aligning a relay optics cell, generally referred to by reference numeral 500. Relay optics cell 500 and flange 140 are attached onto to camera body 110 by mounting screws 181.

Relay optics cell 500 includes an exit aperture 520 at a first end, referred to generally as reference numeral 521 and an entrance aperture 510, at an opposite end 522. Radiation from a scene to be imaged 502 passes from the entrance aperture 510 to the exit aperture 520 to the active surface 180. In the present embodiment the relay optics cell 500 includes an input lens L2 positioned near entrance aperture 510 and an output lens L3 which substantially defines the size of the exit aperture 520. The relay optics cell 500 relays an image formed at its entrance aperture 510 onto, the active surface 180. The magnification of the relay optics cell 500 is selected such that an image formed at entrance aperture 510 is relayed to the sensor active surface 180 and substantially fills the sensor baffle aperture 1730 so that each pixel of the sensor array detects a portion of the scene image 502. The relay optics cell 500 may include any number of lens or mirror elements and may have any entrance aperture shape, size or position, however, in its preferred embodiment the entrance aperture 510 has a shape and aspect ratio substantially equivalent to that of the shape and aspect ratio of the active surface 180 which is also matched by the sensor baffle aperture 1730. Thus the relay optics entrance aperture 510 defines the field stop aperture for the camera system, such that, only rays which enter the camera system through entrance aperture 510 can reach the active surface 180. Furthermore, since as stated above, the shield aperture 1760 defines the limiting aperture of the sensor active surface 180, the camera system performance is optimized when relay optics entrance aperture 510, shield aperture 1760 and sensor aperture 1730 are each sized and shaped to mutually define the camera system field of view.

Relay optics cell 500 further comprises a rigid cylindrical lens barrel 530 having an internal bore locating diameter 540 sized to receive the locating diameter 170 of camera interface bracket 140. An annular mounting surface 560 seats firmly against the annular land area 160 of camera interface bracket 140. The longitudinal axis of internal bore locating diameter 540 defines a barrel axis, A1. An internal cavity 580 centered with respect to axis A1 allows light rays to pass through the lens barrel 530.

Lens L2 is installed through the exit aperture end of the lens barrel 530, through cavity 580. Lens L2, which may include more than one lens or mirror elements assembled into a multi-element lens assembly, is positioned within a protruding annular portion 590 of lens barrel 530. In the present embodiment, lens L2 includes a precision ground annular face 600 seated firmly against a lens locating surface 610 of lens barrel 530. The position of locating surface 610 is tightly controlled with respect to annular mounting surface 560 such that the position of lens L2 with respect to the active surface 180 is established by surface 610. Lens L2 further includes a precision ground locating diameter 620. The longitudinal axis of locating diameter 620 is tightly controlled with respect to an optical axis, A2, of lens L2. Internal bore 630 is sized to receive the lens locating diameter 620 therein and internal bore 630 is tightly controlled with respect to internal bore diameter 540 such that lens axis, A2, barrel axis, A1, and the center of the focal plane array surface 180 are substantially coincident.

Lens L3 forms the exit aperture 520 of lens barrel 530. Lens L3, which may include more than one lens or mirror elements assembled into a multi-element lens assembly, is positioned within an internal bore 640 of lens barrel 530. Bore 640 has a depth sufficiently deep to receive lens L3 therein and has a land area 650 which substantially matches the contour of lens surface 660. The position of land area 650 is tightly controlled with respect to annular mounting surface 560. Lens L3 includes a precision ground locating diameter 620. The longitudinal axis of locating diameter 620 is tightly controlled with respect to an optical axis, A3, of lens L3. Internal bore 640 is tightly controlled with respect to internal bore diameter 540 such that lens optical axis A3 lens barrel axis A1 and the center of the focal plane array surface 180 are substantially coincident. Both lenses L2 and L3 are bonded in place by conventional optical element bonding cements.

Referring to protruding annular portion 590 of lens barrel 530 the entrance aperture 510 is rectangular in shape with an aspect ratio equal to that of the active surface 180. Exit aperture 520 is formed in an end face 670 of barrel 530 with its center coincident with barrel axis A1. Barrel 530 is fashioned to receive a filter assembly, referred to generally by reference numeral 680 which includes a mounting bracket 682 which provides an interface for interchangeably mounting various optical neutral density or wavelength selective filters over the relay cell entrance aperture 510. A filter 700 can be interchanged as required by the particular application of the camera system by replacing the filter assembly 680. Bracket 682 mounts onto protruding annular portion 590 and positions filter 700 in the path of the incoming scene radiation. Filter 700 and bracket 682 are sized so as not to block any rays entering from the scene 502 which would pass through the entrance aperture 520 if the filter 700 were removed.

Lens barrel end surface 710 provides a an interface for mounting a imaging optical assembly, referred to generally by reference numeral 1000. End surface 710 includes a standard K-Mount lens interface bracket 720 used in many camera systems for convenient interchange of imaging optical systems 1000, however, it will be appreciated by those skilled in the art that other interchangeable imaging lens mounting techniques would function equivalently in present invention Imaging optical system 1000 includes an entrance aperture 1010 and a lens L1, which may be a multi-element lens. Lens L1 images a scene or object to be imaged 502 and relays the imaging of the scene or object 502 to an image focal plane 1020 which is ideally position coincident with the relay optics entrance aperture 510 so that the image of the scene is relayed to the active surface 180. An imaging lens barrel 1030 houses lens L3 and provides a mating standard K-Mount interface to relay cell lens mounting interface bracket 720. Imaging lens barrel 1030 includes a stepped internal bore 1040 passing there through. Internal bore 1040 includes a lens mounting diameter 1050 and a lens mounting shoulder diameter 1060 for positioning an optical axis A1 of lens L1 coincident with axes A0, A1 and A2, and for positioning the imaging lens focal plane 1020 with respect to the sensor active surface 180.

Imaging lens barrel 1030 may also include a focus mechanism 1070 for moving lens L1 along an axis coincident with its optical axis thereby moving the image formed at the imaging lens focal plane 1020 through a range of positions. To focus the camera system 100, a grip 1080 is rotatable by an operator with respect to the imaging lens barrel 1030. Grip 1080 attaches to focus mechanism 1070 and moves the focus mechanism 1070 in a spiral groove, not shown, formed in outer diameter 1090 of imaging lens barrel 1030 thereby advancing the lens L1 along its optical axis. It will be appreciated by one skilled in the art that any of a number of focusing mechanisms including engaged threaded members or friction elements may be used to move the lens L1 along its axis A1 and furthermore that auto focus and or mechanized focal systems would function equivalently in the present invention.

Figure 11:
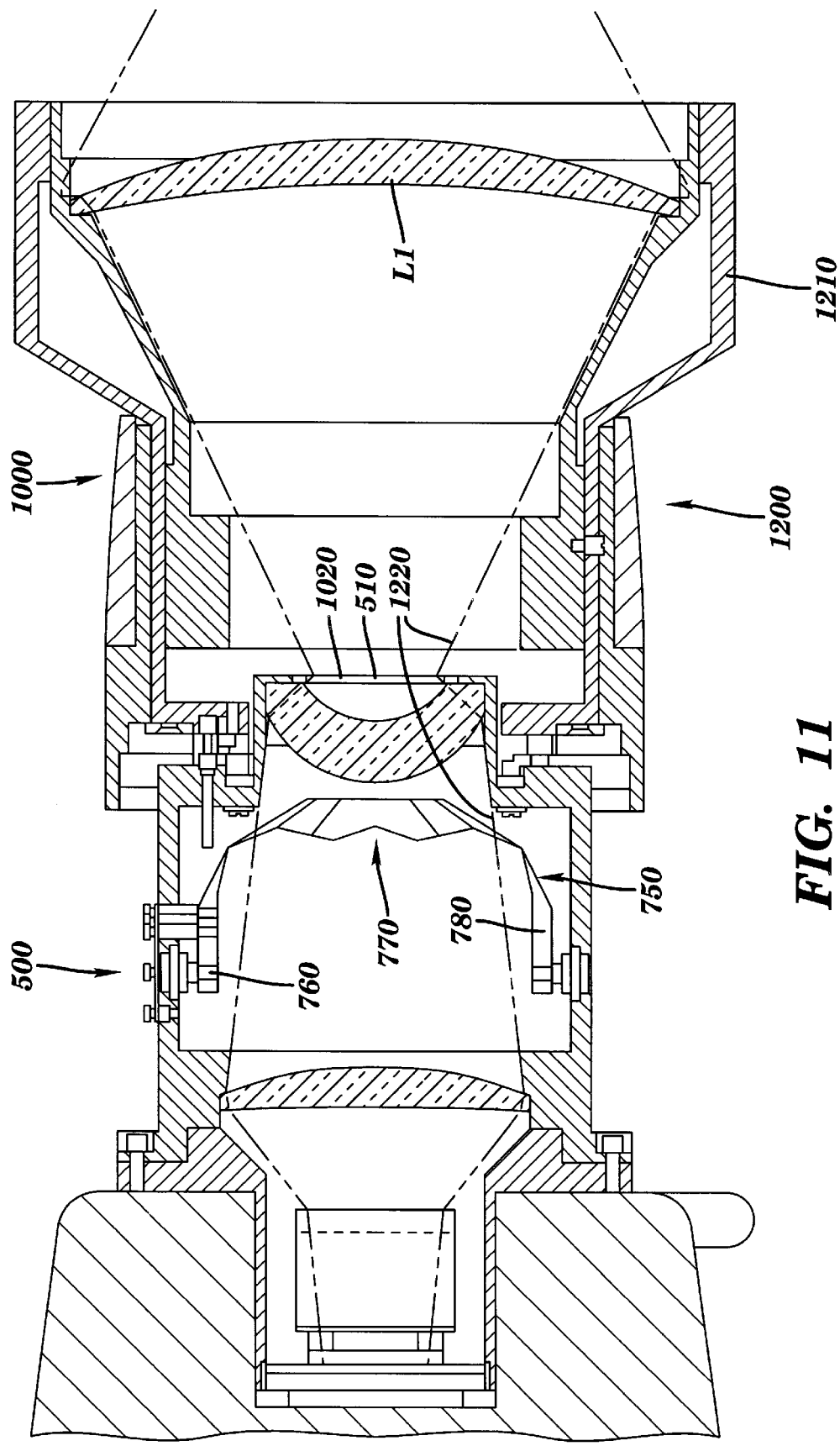
FIG. 11 depicts a section through a UFPA assembly, relay optics cell and an imaging optics assembly with a 8° field of view.

A second imaging optical assembly, referred to generally by reference numeral 1200 is depicted in FIG. 11. Lens L0 provides a longer focal length and a larger entrance aperture than the lens L1. Lens barrel 1210 provides similar functionality to lens barrel 1030 but is longer and larger in diameter to accommodate the longer focal length and aperture size of lens L0. In each embodiment however, an imaging optical assembly focal plane 1020 is positioned coincident with the relay cell entrance aperture 510.

Thus imaging optical assembly 1000 has a short focal length and a narrow field of view while imaging optical assembly 1200 has a longer focal length and a wider field of view, however, each imaging optical assembly has an equivalent field of view at the sensor active area 180. This is shown by the dashed lines 1091 which define marginal rays of the system in FIG. 10 and dashed lines 1220 which define the marginal rays of the system in FIG. 11. In each case the path of the marginal rays leading from the relay cell entrance aperture 510 to the sensor active surface 180 is unchanged. The benefit of this design feature is that the sensor active surface 180 has an identical field of view regardless of the field of view of the imaging optics assembly 1000 or 1200. This improves image quality by eliminating variations in DC offset signal and pixel to pixel signal variation. Also by minimizing the size of the relay optics entrance aperture 510 thermal variations from one edge of the aperture to another become smaller.

Referring now to FIG. 11, within the relay optics cell internal cavity 580 is mounted a shutter 750. Shutter 750 is pivotably suspended on pivot pins 760 mounted in the wall of barrel 530. Shutter 750 forms a shield portion 770 at the end of a pair of pivot arms 780. The shutter is shown in the closed position such that shield portion 770 completely blocks all the rays entering the relay cell entrance aperture 510 and substantially reflects the rays away from the sensor active surface 180. In the open position, shutter 750 is rotate 90° from the closed position so all the rays pass between the pivot arms 780 without being blocked. The shutter 750 may be manually or automatically operated. Furthermore the shutter could be placed within the imaging optical system 1000 or 1200.

In order to calibrate the camera system, the shutter 750 is closed to block radiation from entering from the scene 502 and reaching the sensor active surface 180. A processing module or video processor 2008, included in the electronics module, refereed to generally by reference numeral 2050 as shown in FIG. 8 receives an analog video dark signal value from each pixel element in the active array while the array surface 180 is blocked by the shutter 750. A time averaged dark signal value of each pixel is calculated by the video processor 2008 and a DC offset value and pixel to pixel correction profile are stored in a memory module 2010. The shutter 750 is then opened. A scene 502 is imaged onto the sensor active surface 180 and a scene signal value for each pixel is received by the video processor 2008, and the DC offset value and pixel to pixel correction profile stored in the memory module 2010 are then subtracted from the scene signal value by the video processor 2008 such that a processed scene signal is then viewed, transferred out of the camera system or stored in a memory which may be a removable memory card 2012.

To function as a radiometer, the time averaged dark signal calibration to determine a DC offset value and pixel to pixel correction profile are performed as above. With the shutter 750 opened, a black body radiator of known black body temperature is then imaged in a factory environment. An analog video known black body signal value is received for each pixel by the video processor 2008 and the DC offset and pixel to pixel correction profile stored in the memory module 2010 are subtracted from the known black body temperature signal as above. A known black body temperature value for each pixel is then stored in a memory module 2010.

When using the infrared camera system as a radiometric measuring instrument, the operator images an infrared scene 502 which includes a black body object, the black body temperature of which is to be measured. While the active surface 180 is illuminated by a infrared scene 502 which includes the black body object of unknown black body temperature, an analog video scene signal value from each pixel is received by the video processor 2008 and compared with the analog video known black body signal value stored in the memory module 2010 at the factory and processed to determine the unknown black body temperature of the scene image.

Since in the present invention, the sensor active surface 180 has a field of view which is the same for each imaging optical assembly and since the radiation shield 1740 provides a uniform temperature background image for fields of view outside the active surface field of view, factory black body radiometric calibration does not need to be performed for each of a plurality of interchanged imaging optical assemblies 1000 and 1200.

It will also be recognized by those skilled in the art that, while the invention has been described above in terms of preferred embodiments, it not limited thereto. Various features and aspects of the above described invention may be used individually or jointly. Further, although the invention has been described in the context of its implementation in a particular environment, and for particular applications, e.g. an infrared sensor assembly and an infrared video camera system, those skilled in the art will recognize that its usefulness is not limited thereto and that the present invention can be beneficially utilized in any number of environments and implementations. Accordingly, the claims set forth below should be construed in view of the full breath and spirit of the invention as disclosed herein.

What we claim and desire to secure by Letters of Patent of the United States are the following:

1. An uncooled infrared sensor assembly comprising:
   (a) an uncooled infrared sensor having an active surface for providing an analog video signal in response to infrared radiation falling thereon;
   (b) a radiation shielding chamber formed to surround the uncooled infrared sensor for shielding radiation from said active surface, the chamber providing continuous walls for shielding the sensor and a shield aperture for defining a field of view of said active surface thereby limiting the radiation entering the chamber to a prescribed solid cone angle defined by the shield aperture: and,
   (c) wherein the chamber walls provide a substantially uniform non-varying infrared radiation scene to the active surface for all angles not included in the prescribed solid cone angle.

2. An uncooled infrared sensor assembly according to claim 1 further comprising, a device for maintaining the infrared sensor, the active surface and the radiation shielding chamber walls at a substantially constant uniform temperature.

3. An uncooled infrared sensor assembly according to claim 2 wherein the continuous chamber walls are assembled to provide a substantially uninterrupted thermally conductive path between the device and the continuous chamber walls.

4. An uncooled infrared sensor assembly according to claim 1, wherein the continuous chamber walls comprise:
   (a) a header base having a top surface for supporting the uncooled infrared sensor with the active surface facing away from the top surface, the header base further including pins passing therethrough for electrically connecting the infrared sensor to an electronics module outside the chamber walls;
   (b) a header cover flange mounted onto the header base, the header cover flange including, a first rectangular flange for surrounding the uncooled infrared sensor while providing a gap between the first rectangular flange and the sensor, and wherein a thermoelectric cooling device is mounted into the gap in thermal contact with the infrared sensor and the first rectangular flange, the thermoelectric device being controlled to maintaining the sensor and the continuous chamber walls at a substantially constant uniform temperature;
   (c) a thermally conductive radiation shield base, having a second rectangular flange on a bottom side thereof, and circular flange on a top side thereof, the radiation shield base being attached by the second rectangular flange to a carrier board mounted between the second rectangular flange and the first rectangular flange;
   (d) a thermally conductive thin walled cylindrical radiation shield, which is open at a bottom end thereof for attaching to the radiation shield base, at the circular flange thereof, and, open at a top end thereof, to provide a shield aperture for defining the solid cone angle of radiation entering the chamber; and,
   (e) wherein each of the header base, the infrared sensor, the header cover flange, the carrier board, the radiation shield base and the radiation shield are thermally conductively assembly together such the entire chamber is maintained at a substantially constant uniform temperature by the thermoelectric cooler.

5. An infrared sensor assembly according to claim 2 further comprising:
   (a) a temperature sensor for sensing a temperature proximate to said active surface; and,
   (b) an electrical driver, in communication with said device and said temperature sensor, for driving said device to maintain the infrared sensor, the active surface. and the chamber walls at the substantially constant uniform temperature.

6. An uncooled infrared sensor assembly according to claim 1 wherein said substantially constant uniform temperature is in the range of 0° C. to 40° C.

7. An infrared sensor assembly according to claim 1 wherein said uncooled infrared sensor is an array of microbolometric detector elements.

8. The apparatus of claim 7 wherein the substantially uniform non-varying temperature is in the range of 0° C. to 40° C.

9. An infrared sensor assembly according to claim 1 wherein said uncooled infrared sensor is a pyroelectric sensor.

10. An infrared sensor assembly according to claim 2 wherein said device is thermally conductively connected at a first side to said uncooled infrared sensor and at a second opposite side to a first heat sink, said infrared sensor assembly further comprising:

(a) a heat pipe connected at a first end to said first heat sink; and, (b) a second heat sink connected to said heat pipe at a second opposite end to said first end.

11. An infrared sensor assembly according to claim 1 wherein said chamberwalls include an inner surface and wherein the inner surface is treated to provide high emmissivity for absorbing infrared radiation falling thereon.

12. An infrared sensor assembly according to claim 1 wherein said chamber walls include an outer surface and wherein the outer surface is treated to provide low emmissivity for reflecting infrared radiation falling thereon.

13. An infrared sensor assembly according to claim 1 wherein the chamber walls include an inner surface, further comprising; a sensor baffle having a sensor aperture substantially matching the size and shape of said active area, said sensor baffle being mounted inside the chamber and proximate to the active area for locking radiation reflected from the inner surface of the chamber walls from reaching said active surface.

14. An uncooled infrared sensor assembly according to claim 1 wherein said uncooled infrared sensor and said radiation shielding chamber are housed in a vacuum chamber maintained below atmospheric pressure and further wherein the infrared sensor, the active surface and the radiation shielding chamber walls and the vacuum chamber are maintained at a substantially constant uniform temperature.

15. An infrared video camera system, comprising (a) a camera body for housing an electronics module;

(b) an uncooled infrared sensor having an active surface for providing an analog video signal in response to infrared radiation falling thereon, the analog video signal being communicated to the electronics module for signal processing thereby;

(c) a radiation shielding chamber formed to surround the uncooled infrared sensor for shielding radiation from said active surface, the shielding chamber providing continuous walls for shielding the sensor and a shield aperture for defining a field of view of said active surface thereby limiting the radiation entering the chamber to a prescribed solid cone angle defined by the shield aperture; and, (d) wherein the chamber walls provide a substantially uniform non-varving infrared radiation scene to the active surface for all angles not included in the prescribed solid cone angle.

16. An infrared video camera system according to claim 15, wherein the continuous chamber walls comprise:

(a) a header base having a top surface for supporting the uncooled infrared sensor with the active surface facing away from the top surface, the header base further including pins passing therethrough for electrically connecting the infrared sensor to an electronics module outside the chamber walls;

(b) a header cover flange mounted onto the header base, the header cover flange including, a first rectangular flange for surrounding the uncooled infrared sensor while providing a gap between the first rectangular flange and the sensor, and wherein a thermo-electric cooling device is mounted into the gap in thermal contact with the infrared sensor and the first rectangular flange, the thermoelectric device being controlled to maintaining the sensor and the continuous chamber walls at a substantially constant uniform temperature;

(c) a thermally conductive radiation shield base, having a second rectangular flange on a bottom side thereof, and circular flange on a top side thereof, the radiation shield base being attached by the second rectangular flange to a carrier board mounted between the second rectangular flange and the first rectangular flange;

(d) a thermally conductive thin walled cylindrical radiation shield, which is open at a bottom end thereof for attaching to the radiation shield base, at the circular flange thereof, and, open at a top end thereof, to provide a shield aperture for defining the solid cone angle of radiation entering the chamber; and, (e) wherein each of the header base, the infrared sensor, the header cover flange, the carrier board, the radiation shield base and the radiation shield are thermally conductively assembly together such the entire chamber is maintained at a substantially constant uniform temperature by the thermoelectric cooler.

17. An uncooled camera system according to claim 15 further comprising a device for maintaining the uncooled infrared sensor, the active surface and the radiation shielding chamber walls at a substantially constant uniform temperature.

18. An infrared sensor assembly according to claim 17 further comprising:

(a) a temperature sensor for sensing a temperature proximate to said active surface; and, (b) an electrical driver, in communication with said device and said temperature sensor, for driving said device to maintain the infrared sensor, the active surface, and the chamber walls at the substantially constant uniform temperature.

19. An infrared video camera system according to claim 17 further comprising:

(a) a first heat sink thermally conductively mounted to said device;

(b) a second heat sink mounted external to said camera body; and, (c) a heat pipe thermally connected between said first and second heat sinks for drawing thermal energy from said first heat sink to said second heat sink mounted externally to said camera body.

20. An infrared video camera system according to claim 19 wherein said second heat sink has a larger heat sink capacity than said first heat sink.

21. An infrared video camera system according to claim 15, further comprising:

(a) a relay optics cell mounted to said camera body, said relay optics cell including a relay optics cell exit aperture at a camera end and a relay optics cell entrance aperture at an opposite end to said camera end, said relay optics cell further comprising at least one optical element for relaying an image of said entrance aperture onto the active surface, said image of said entrance aperture substantially filling the active surface; and, (b) an imaging optics assembly mounted to said relay optics cell at said opposite end, said imaging optics assembly comprising at least one optical element for forming an IR scene image onto said entrance aperture said IR scene image substantially filling said entrance aperture.

22. An infrared video camera system according to claim 21 wherein said relay optics cell further comprises a mounting interface for mounting an optical filter element substantially coincident with said entrance aperture.

23. An infrared video camera system according to claim 22 wherein said mounting interface provides a device for interchangeably mounting of a plurality of optical filter elements.

24. An infrared video camera system according to claim 21 wherein a plurality of imaging optics assemblies, each having a different field of view, are interchangeably mountable with said relay optics cell and wherein each of said plurality of imaging optics assemblies forms an IR scene image which is substantially coincident with and substantially fills said entrance aperture.

25. An infrared video camera system according to claim 21 wherein, said active surface comprises a plurality of image pixels, said infrared video camera further comprising:
  (a) a shutter for blocking radiation from reaching said active surface;
  (b) a processing module included in said electronics module for receiving and processing an analog video dark signal value from each of said plurality of image pixels while said active area is blocked by said shutter said processor further receiving and processing an analog video scene signal value from each of said plurality of image pixels while said active area is illuminated by an infrared scene;
  (c) a memory module for storing each of said analog video dark signal values; and,
  (d) wherein said processor module processes each of said analog video scene signal values received from each of said plurality of image pixels while said camera is viewing an infrared scene by adjusting each of said analog video scene signal values according to a corresponding dark signal value.

26. An infrared video camera system according to claim 25 wherein said shutter is mounted within a hollow cavity inside said relay optics cell.

27. An infrared video camera system according to claim 21 wherein said active surface includes a plurality of image pixels and wherein said infrared video camera is used to determine the temperature of a black body radiator, said infrared video camera further comprising:
  (a) a processing module included in said electronics module for receiving and processing an analog video known black body signal value from each of said plurality of image pixels while said active area is illuminated by a black body of known black body temperature said processor further receiving and processing an analog video scene signal value from each of said plurality of image pixels while said active area is illuminated by an infrared scene which includes a black body of unknown black body temperature;
  (b) a memory module for storing said analog video known black body signal value for each of said plurality of pixels; and,
  (c) wherein said processor module processes each of said analog video scene signal values received from each of said plurality of image pixels while said camera is illuminated by an infrared scene which includes a black body of unknown black body temperature by adjusting each of said analog video scene signal values according to a corresponding analog video known black body signal value.

28. In an infrared imaging system which includes an uncooled infrared sensor for providing an analog signal in response to infrared radiation falling onto an active surface thereof, a method for artificially creating a reference background image comprising the steps of:
  (a) surrounding the uncooled infrared sensor with a radiation shielding chamber comprising a continues surrounding wall and a shield aperture formed in the surrounding wall;
  (b) defining a field of view of the active surface by sizing and positioning the shield aperture to limit the radiation entering the chamber to a prescribed solid cone angle defined by the shield aperture; and,
  (c) wherein the continuous surrounding chamber wall provides said reference background image to the active surface for all angles not included in the prescribed solid cone angle.

29. The method according to claim 28 further comprising the step of maintaining the continuous surrounding chamber wall and the infrared sensor at a substantially constant uniform temperature such that said reference background image comprises a substantially uniform non-varying radiation scene.

30. The method according to claim 29 wherein the substantially constant uniform temperature is in the range of 0° C. to 40° C.

31. The method according to claim 29, further comprising the step of, providing a substantially thermally conductive path between the infrared sensor and the continuous surrounding chamber wall.

32. The method according to claim 31 further comprising steps of:
  (a) enclosing the infrared sensor and the radiation shielding chamber within a vacuum chamber, said vacuum chamber including a vacuum chamber surrounding wall and a vacuum chamber aperture for allowing infrared radiation to enter the vacuum chamber, and wherein the vacuum chamber aperture is sealed by a transparent window; and,
  (b) maintaining the interior of the vacuum chamber at a pressure below atmospheric pressure to facilitate maintaining the infrared sensor, the active surface and the radiation shielding chamber surrounding wall at a substantially constant uniform temperature.

33. The method according to claim 32, further comprising the step of; providing a substantially thermally conductive path between the infrared sensor, the radiation shielding chamber walls and the vacuum chamber surrounding wall.

34. The method according to claim 28, wherein the infrared imaging system includes a camera body for housing the uncooled infrared sensor, the method further comprising the steps of:
  (a) providing a relay optics cell mounted to the camera body, said relay optics cell including a relay optics cell exit aperture, at a camera end thereof, and a relay optics cell entrance aperture, at an opposite end to the camera end, said relay optics cell further comprising at least one optical element for relaying an image of said relay optics cell entrance aperture onto the active surface such that the image of said relay optical cell entrance aperture substantially fills the active surface; and,
  (b) providing an imaging optics assembly mounted to said relay optics cell at said opposite end, said imaging optics assembly comprising at least one optical element for forming an image of an infrared scene onto said relay optics cell entrance aperture, such that the image of the infrared scene substantially filling the relay optics cell entrance aperture.

35. The method of claim 34 wherein a plurality of interchangably mountable imaging optical assemblies are provided for mounting, one at a time, to the relay optics cell and wherein each of the imaging optical assemblies includes at least one optical element further comprising the steps of:

(a) providing each of the interchangably mountable imaging optical assemblies with one of a different field of view or a different magnification; and, (b) forming an image of an infrared scene onto said relay optics cell entrance aperture with one of the plurality of interchangably mountable imaging optical assemblies such that the image of the infrared scene formed by the one imaging optical assembly substantially fills the relay optics cell entrance aperture.

* * * * *